(12) United States Patent
Curtiss et al.

(10) Patent No.: US 8,589,715 B2
(45) Date of Patent: Nov. 19, 2013

(54) METHOD AND SYSTEM FOR CORRECTING TIMING ERRORS DUE TO THERMAL CHANGES WITHIN A PORTABLE COMPUTING DEVICE

(75) Inventors: Troy R. Curtiss, Boulder, CO (US); Vamsee K. Somavarapu, Boulder, CO (US); Glenn A. Salaman, Boulder, CO (US); Stanley Tsai, Boulder, CO (US); Gregory R. Lie, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 183 days.

(21) Appl. No.: 13/104,720

(22) Filed: May 10, 2011

(65) Prior Publication Data
US 2012/0290866 A1 Nov. 15, 2012

(51) Int. Cl.
G06F 1/00 (2006.01)
G06F 1/12 (2006.01)
H04L 7/00 (2006.01)

(52) U.S. Cl.
USPC ............................. 713/400; 714/744; 455/502

(58) Field of Classification Search
USPC ............................ 713/400; 455/502; 714/744
See application file for complete search history.

(56) References Cited

U.S. PATENT DOCUMENTS

| 5,729,722 A * | 3/1998 | Matsumoto ................... 713/601 |
| 6,453,181 B1 | 9/2002 | Challa et al. |
| 7,190,962 B2 | 3/2007 | Brehler et al. |
| 7,463,910 B2 | 12/2008 | Wang et al. |
| 7,500,125 B2 | 3/2009 | Yasumoto |
| 8,249,616 B2 * | 8/2012 | Boejer et al. ................ 455/456.1 |
| 2003/0043766 A1 | 3/2003 | McDonough et al. |
| 2005/0221847 A1 * | 10/2005 | Brehler et al. ................. 455/502 |
| 2008/0222440 A1 | 9/2008 | Jones et al. |
| 2009/0147899 A1 | 6/2009 | Arviv et al. |
| 2010/0231307 A1 | 9/2010 | Walley |
| 2010/0317295 A1 | 12/2010 | Borsella et al. |

FOREIGN PATENT DOCUMENTS

GB 2433332 A 6/2007

OTHER PUBLICATIONS

International Search Report and Written Opinion—PCT/US2012/037391—ISA/EPO—Dec. 19, 2012.

* cited by examiner

*Primary Examiner* — Mark Connolly
(74) *Attorney, Agent, or Firm* — Nicholas A. Cole

(57) ABSTRACT

A method and system for correcting timing errors due to thermal changes within a portable computing device are disclosed. The system and method may include calculating an estimate of frequency for a first clock compared to a second clock. The first clock may comprise a crystal oscillator while the second clock comprises a system clock. Next, a sleep state may be calculated for a hardware device, such as radio access technology ("RAT") module, based on the estimate of frequency for the first clock. An error in the frequency of the first clock that may occur during the sleep state of the hardware device may be calculated. Subsequently, a magnitude of time that corresponds to an actual length of the sleep state relative to the second clock may be calculated so that an internal clock of the hardware devices may be synchronized with the second clock.

36 Claims, 7 Drawing Sheets

METHOD AND SYSTEM FOR CORRECTING TIMING ERRORS DUE TO THERMAL CHANGES WITHIN A PORTABLE COMPUTING DEVICE

DESCRIPTION OF THE RELATED ART

Portable computing devices ("PCDs") are becoming necessities for people on personal and professional levels. These devices may include cellular telephones, portable/personal digital assistants ("PDAs"), portable game consoles, portable navigation units, palmtop computers, and other portable electronic devices.

One aspect of PCDs that make them unique relative to other electronic devices, like laptop computers or personal computers, is that they are usually cooled only with passive cooling systems and/or devices. In other words, most PCDs do not have any active cooling devices, such as fans, liquid cooling systems, or other power consuming cooling devices. Since most PCDs do not have any active cooling devices, they are generally more susceptible to significant temperature changes caused by heat generated by the electronics of a particular PCD.

For example, it is possible for some PCDs to experience temperature shifts/gradients on the order of 20° C. to 30° C. as electronics within a PCD heat up due to routine activities. These temperature shifts/gradients may also be caused by environmental factors such as exposure to extreme outdoor environments (i.e., exposure to sunlight outside on a hot summer day). Exemplary routine activities of a PCD that usually produce internal heat may include, but are not limited to, transmitting radio-frequency ("RF") based data and voice communications.

One problem associated with the heating of within a PCD is how heat may degrade the performance of certain electronic devices within the PCD. Particularly, excessive heating within a PCD may negatively impact the performance of certain types of clocking mechanisms, such as crystal oscillators. Heat within a PCD may shift the timing constant of a crystal oscillator which in turn decreases the accuracy of the crystal oscillator. This is significant when internal hardware devices use the crystal oscillator as their clock.

When the accuracy of a crystal oscillator clock decreases, this negatively impacts the performance of any electronic device which is associated with this clock. For example, a crystal oscillator may be used as a sleep clock for a processor which desires to enter into a sleep state and to exit from the sleep state based on the timing provided by the sleep clock. If the timing of the sleep clock is off, then the processor entering into the sleep state will not exit the sleep state correctly. When the processor does not exit the sleep state correctly, its performance is degraded because its timing will be off relative to other active components within the PCD. This change in timing is significant because other active components of the PCD will usually have maintained their correct timing while the processor was in its sleep state.

Accordingly, what is needed in the art is a method and system that addresses these problems. Specifically, a method and system is needed in the art for correcting the timing associated with a sleep clock that may be negatively impacted by internal heating of PCD.

SUMMARY

A method and system for correcting timing errors due to thermal changes within a portable computing device are disclosed. The system and method may include calculating an estimate of a frequency for a first clock compared to a second clock. The first clock may comprise a crystal oscillator while the second clock comprises a system clock having global positioning system ("GPS") precision. Next, a sleep state may be calculated for a hardware device, such as radio access technology ("RAT") module, based on the estimate of frequency for the first clock. An error in the frequency of the first clock that may occur during the sleep state of the hardware device may then be calculated. This error in the frequency of the first clock may be caused by thermal changes within the PCD.

A magnitude of time that corresponds to an actual length of the sleep state relative to the second clock may be calculated so that an internal third clock of the hardware device may be synchronized with the second clock.

Calculating the error in the frequency of the first clock for a duration of the sleep state may include at least one of a mean calculation and an integration calculation. The mean calculation may be performed by the hardware device exiting its sleep state while the integration calculation may be performed by a dedicated hardware device, such as a sleep clock estimator, which monitors the timing of the first clock. Usually, the portable computing device does not have any active thermal mitigation systems that consume power, such as fans, liquid cooling systems, etc.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
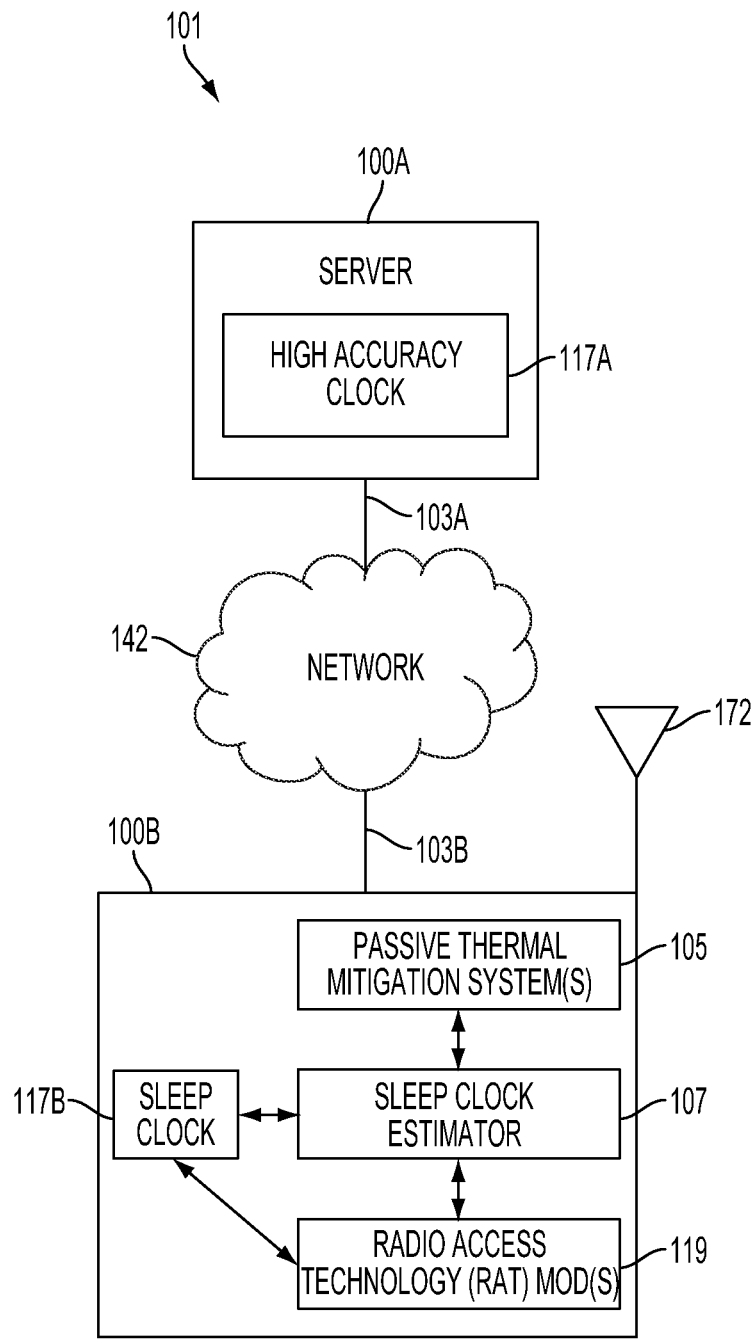
FIG. 1 is a functional block diagram illustrating exemplary elements of a system for correcting timing errors due to thermal changes within a PCD.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") and fourth generation ("4G") wireless technology, greater bandwidth availability has enabled more portable computing devices with a greater variety of wireless capabilities.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology, have enabled numerous PCDs with multiple capabilities. Therefore, a PCD may be a cellular telephone, a satellite telephone, a pager, a personal digital assistant ("PDA"), a smartphone, a navigation device, a smartbook or reader, a media player, a combination of the aforementioned devices, and a laptop computer with a wireless connection, among others.

FIG. 1 is a functional block diagram illustrating exemplary components of a system 101 for correcting timing errors due to thermal changes within a PCD 100B. The system 101 may comprise a PCD 100B and a computer server 100A. Many of the system elements illustrated in FIG. 1 are coupled via communications links 103 to the communications network 142.

The links 103 illustrated in FIG. 1 may comprise wired or wireless links. Wireless links include, but are not limited to, radio-frequency ("RF") links, infrared links, acoustic links, and other wireless mediums. The communications network 142 may comprise a wide area network ("WAN"), a local area network ("LAN"), the Internet, a Public Switched Telephony Network ("PSTN"), a paging network, or a combination thereof. The communications network 142 may be established by broadcast RF transceiver towers (not illustrated).

However, one of ordinary skill in the art recognizes that other types of communication devices besides broadcast RF transceiver towers are available for establishing the communications network 142. The PCD 100B is shown to have an antenna 172 so that a respective PCD 100B may establish wireless communication links 103B with the communications network 142 via RF transceiver towers (not illustrated).

The PCD 100B may comprise one or more passive thermal mitigation systems 105, a sleep clock 117B, a sleep clock estimator ("SCE") module 107, and one or more radio access technology ("RAT") modules 119. The passive thermal mitigation system 105 may comprise one or more devices that do not consume power in order to cool the PCD 100B. For example, the thermal mitigation system 105 may comprise one or more structures like physical heat sinks, such as metal plates and/or air gaps, that conduct heat and move it away from certain electronics within the PCD 100B.

The PCD 100B may not include any active cooling devices such as fans, liquid cooling systems, and the like. Active cooling devices usually consume power as understood by one of ordinary skill in the art. This fact is important because many PCDs 100B are usually battery powered. Because PCDs 100B are usually battery powered, then any active cooling devices would significantly impact the life of the battery which is essential for the performance of the PCD 100B.

The sleep clock 117B may comprise an off-the-shelf crystal oscillator. The crystal oscillator may have a frequency of approximately 32.768 kHz as understood by one of ordinary skill in the art. However, other types of clocks for the sleep clock 117B are within the scope of this disclosure as understood by one of ordinary skill in the art. For example, the sleep clock 117B may be part of or may be calculated from a central high-frequency oscillator having a frequency of about 19.2 MHz. In such an exemplary embodiment, the sleep clock timing may be calculated by dividing the 19.2 MHz with a fixed integer as understood by one of ordinary skill in the art.

The sleep clock estimator module 107 may comprise software or hardware or both for measuring a current frequency of the sleep clock 117B by using a high accuracy clock 117A that is maintained at the server 100A. Further details about the sleep clock estimator module 107 will be described below in connection with FIG. 3.

The one or more radio access technology ("RAT") module(s) 119 may comprise hardware or software or both for establishing over the air interface links 103B with the communications network 142. The one or more RAT module(s) 119 may support mobile telephone communications.

Such mobile telephone communications may include those governed by the one-X ("1-x") Radio Transmission Technologies ("1xRTT") standard and the code division multiple access ("CDMA") evolution-data optimized ("EV-DO") standard. These communication standards are typically used by mobile telephones to provide voice and broadband Internet access for the PCD 100B.

A first RAT module 119 may use the sleep clock 117B when it enters into and exits a sleep state. As understood by one of ordinary skill in the art, a "sleep state" for a PCD 100B is one in which a particular hardware device of a PCD 100B consumes very little power and is considered to be dormant or inactive. A hardware device may exit a sleep state relatively quickly compared to an "off" state. An "off" state is quite different from a sleep state in that an "off" state does not consume any power of the PCD 100B whatsoever as understood by one of ordinary skill in the art. Meanwhile, a hardware device of a PCD 100B in a sleep state consumes power, although at a very minimal level relative to its active state in which more power is consumed.

A second RAT module 119 may also be responsible for querying the sleep clock estimator module 107 when the first RAT module 119 has entered into a sleep state. However, in another exemplary embodiment, a portion of a RAT module 119 may enter into a sleep state while another portion of the RAT module 119 remains active and queries the sleep clock estimator module 107. Such a situation may exist with a multiple-core processor in which one core is placed into a "sleep" state while another cores is allowed to remain active. Further details about the RAT modules 119 will be described in further detail below in connection with FIG. 3.

As noted previously, the computer server 100A may comprise a high accuracy clock 117A that is generally more accurate compared to the sleep clock 117B. As noted previously, the sleep clock 117B may comprise a crystal oscillator. Meanwhile, opposite to the sleep clock 117B, the high accuracy clock 117A of the server 100A is usually tied or associated with global positioning satellite ("GPS") functionality. The high accuracy clock 117A may be referred to as a main system clock as understood by one of ordinary skill in the art.

The high accuracy clock 117A may comprise a frequency generator or an oscillator that generates an electrical signal having a very precise predefined frequency. The clock signal of the high accuracy clock 117A may be used to synchronize and coordinate the operations of various circuits and components in the PCD 100B. Cellular networks for wireless digital telecommunications, such as GSM ("Global System for Mobile communications") for example, set exacting specifications for network protocols. Therefore, highly accurate frequency generators such as the high accuracy clock 117A are used to meet these exacting specifications and are typically synchronized with the communication network 142. The server 100A may support both the data and voice communications of the portable computing device ("PCD") 100B.

Figure 2:
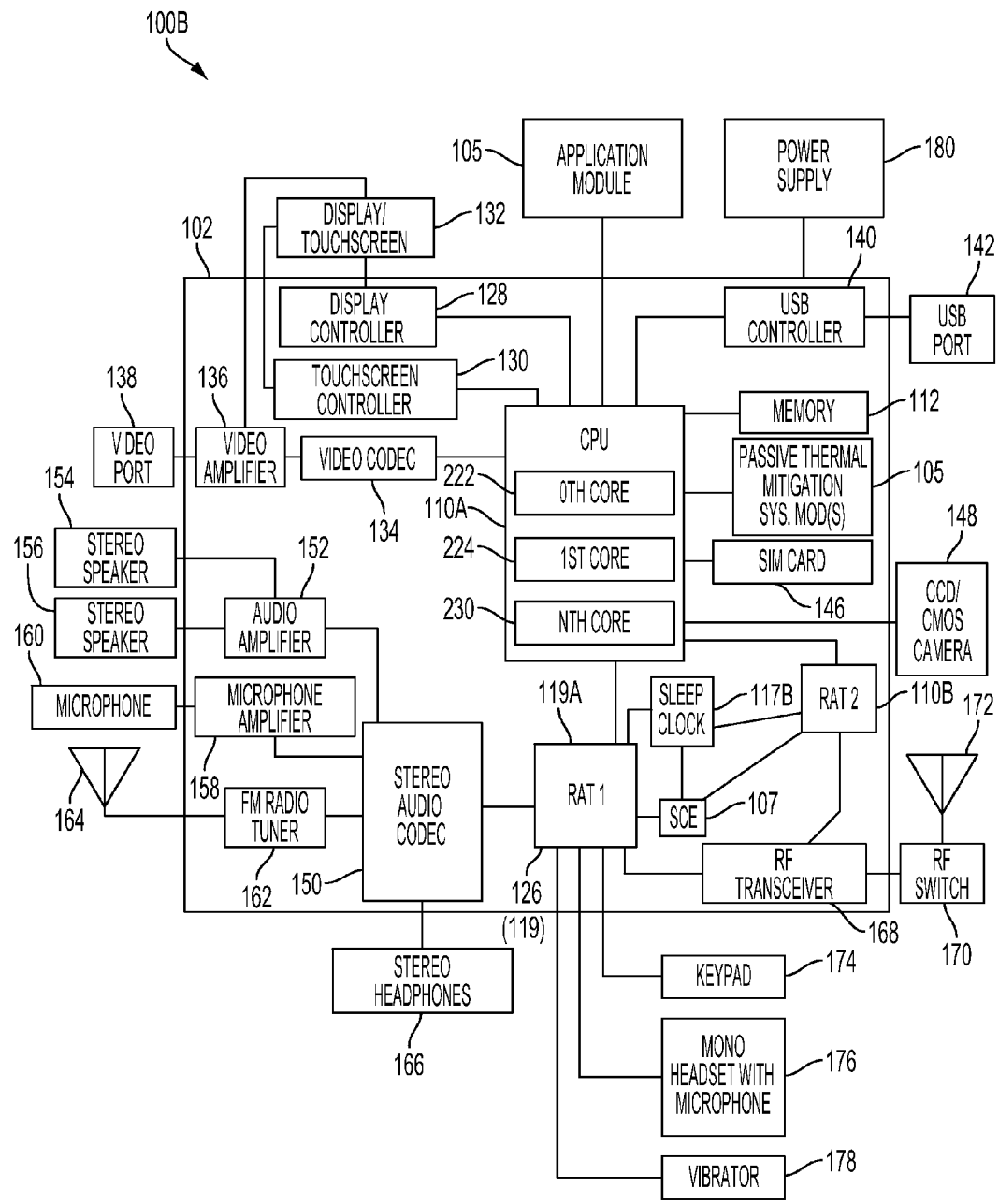
FIG. 2 is a functional block diagram illustrating an embodiment of a portable computing device (PCD) having the system for correcting timing errors due to thermal changes within a PCD.

Referring to FIG. 2, this figure is a functional block diagram of an exemplary, non-limiting aspect of a PCD 100B in the form of a wireless telephone for implementing methods and systems for correcting timing errors due to thermal changes within a PCD 100. As shown, the PCD 100B includes an on-chip system 102 that has a multi-core, central processing unit ("CPU") 110A, a first radio access technology ("RAT1") module 119A, and a second radio access technology ("RAT2") module 119B. These components 110A, 119 may be coupled together.

As described above in connection with FIG. 1, The each radio access technology ("RAT") module 119 may comprise hardware or software or both for establishing over the air interface links 103B with the communications network 142. The one or more RAT module(s) 119 may support mobile telephone communications. Further details of the RAT module(s) 119 will be provided below in connection with FIG. 3.

The CPU 110A may comprise a zeroth core 222, a first core 224, up through an Nth core 230 as understood by one of ordinary skill in the art. In an alternate embodiment, instead of using a CPU 110A, one or more digital signal processors ("DSPs") may also be employed as understood by one of ordinary skill in the art.

The PCD 100B may further comprise a sleep clock 117B, a sleep clock estimator ("SCE") module 107, and one or more passive thermal mitigation systems 105. The one or more passive thermal mitigation systems 105 usually do not consume any power of the PCD and are described above in connection with FIG. 1.

The sleep clock 117B, as discussed above in connection with FIG. 1, may comprise an off-the-shelf crystal oscillator as understood by one of ordinary skill in the art. As further noted above, the SCE module 107 may comprise software or hardware or both for measuring a current frequency of the sleep clock 117B by using a high accuracy clock 117A (FIG. 1) that is maintained at the server 100A. Further details about the SCE module 107 will be described below in connection with FIG. 3.

The PCD 100B may comprise memory 112 that stores an application program module 105 when the application program module 105 is not being executed by the multi-core CPU 110A. The application program module 105 may comprise any one or a plurality of software programs, such as, but not limited to, mobile phone calling application program, e-mail application program, internet browsing application programs, and the like. The application program module 105 may initiate queries to and receive information from the RAT modules 119.

In a particular aspect, one or more of the method steps described herein may be implemented by executable instructions and parameters stored in RAT modules 119 and the SCE module 107. These instructions that form the functions and features of the SCE module 107 may be executed by the by the SCE module 107 as well as the RAT modules 119. Further, RAT modules 119 and SCE module 107, the instructions stored therein, or a combination thereof may serve as a means for performing one or more of the method steps described herein.

As illustrated in FIG. 2, a display controller 128 and a touchscreen controller 130 are coupled to the CPU 110A. A touchscreen display 132 external to the on-chip system 102 is coupled to the display controller 128 and the touchscreen controller 130.

FIG. 2 is a schematic diagram that illustrates a video encoder 134, e.g., a phase-alternating line ("PAL") encoder, a sequential couleur avec memoire ("SECAM") encoder, a national television system(s) committee ("NTSC") encoder or any other type of video encoder 134 coupled to the multi-core central processing unit ("CPU") 110A.

A video amplifier 136 is coupled to the video encoder 134 and the touchscreen display 132. A video port 138 is coupled to the video amplifier 136. As depicted in FIG. 2, a universal serial bus ("USB") controller 140 is coupled to the CPU 110A. Also, a USB port 142 is coupled to the USB controller 140. A subscriber identity module (SIM) card 146 may also be coupled to the CPU 110A. Further, as shown in FIG. 2, a digital camera 148 may be coupled to the CPU 110A. In an exemplary aspect, the digital camera 148 is a charge-coupled device ("CCD") camera or a complementary metal-oxide semiconductor ("CMOS") camera.

As further illustrated in FIG. 2, a stereo audio CODEC 150 may be coupled to the first RAT module 119A. Moreover, an audio amplifier 152 may be coupled to the stereo audio CODEC 150. In an exemplary aspect, a first stereo speaker 154 and a second stereo speaker 156 are coupled to the audio amplifier 152. FIG. 2 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 2 further indicates that a radio frequency ("RF") transceiver 168 may be coupled to the first and second RAT modules 119A, 119B. An RF switch 170 may be coupled to the RF transceiver 168 and an RF antenna 172. As shown in FIG. 2, a keypad 174 may be coupled to the first RAT module 119A. Also, a mono headset with a microphone 176 may be coupled to the first RAT module 119A. Further, a vibrator device 178 may be coupled to the first RAT module 119A. FIG. 2 also shows that a power supply 180, for example a battery, is coupled to the on-chip system 102. In a particular aspect, the power supply 180 includes a rechargeable DC battery or a DC power supply that is derived from an alternating current ("AC") to DC transformer that is connected to an AC power source.

As depicted in FIG. 2, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 102.

Figure 3:
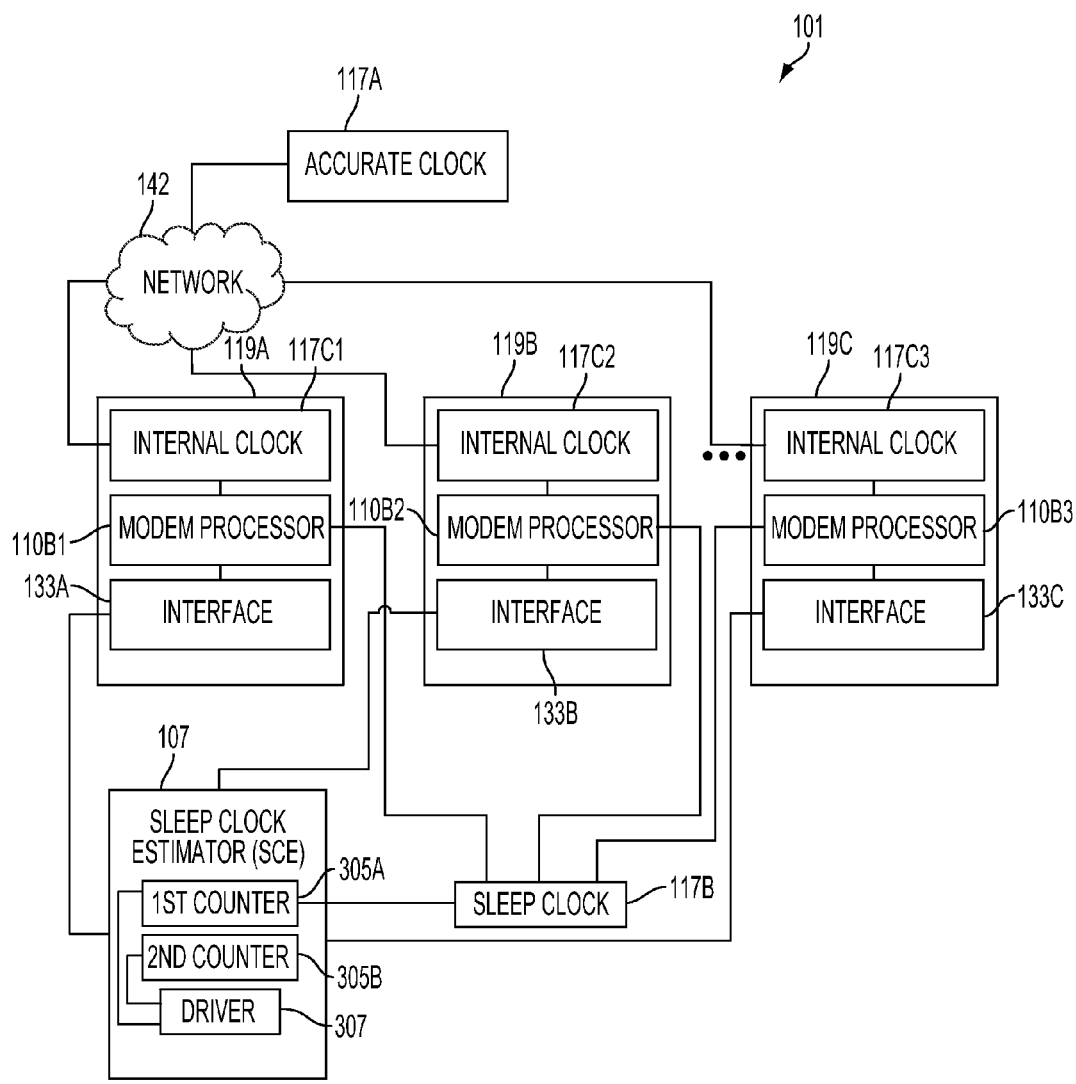
FIG. 3 is a functional block diagram illustrating additional exemplary details of the system for correcting timing errors due to thermal changes within a PCD.

FIG. 3 is a functional block diagram illustrating additional exemplary details of the system 101 for correcting timing errors due to thermal changes within a PCD 100B. As illustrated in FIG. 3, each RAT module 119 may comprise an internal clock 117C, a modem processor 110B, and an interface 133. Each of these three components within a respective RAT module 119 are coupled together. Each modem processor 110B may comprise either an analog signal processor or a digital signal processor as understood by one of ordinary skill in the art. Three RAT modules 119 are illustrated in FIG. 3: a first RAT module 119A, a second RAT module 119B, and a Nth RAT module 119C.

The interface 133 of each RAT module 119 may comprise hardware or software (or both) that allows each modem processor 110B to indicate with the sleep clock estimator 107. As noted above, each RAT module 119 may support mobile telephone communications as understood by one of ordinary skill in the art.

Such mobile telephone communications may include those governed by the one-X ("1-x") Radio Transmission Technologies ("1xRTT") standard and the code division multiple access ("CDMA") evolution-data optimized ("EV-DO") standard. These communication standards are typically used by mobile telephones to provide voice and broadband Internet access for the PCD 100B. For example, the first RAT module 119A may support the 1xRTT standard for voice communications while the second RAT module 119B may support CDMA EV-DO standard for data communications. As another example, the first RAT module 119A and second RAT module 119B may support the same communications standard, either the CDMA EV-DO standard or the 1xRTT standard, as understood by one of ordinary skill in the art.

The first RAT module 119A may use the sleep clock 117B when it enters into and exits a sleep state. As understood by one of ordinary skill in the art is, a "sleep state" for a PCD 100B is one in which a particular hardware device of a PCD 100B consumes very little power and is considered to be dormant or inactive. A hardware device may exits a sleep state relatively quickly compared to an "off" state. An "off" state is quite different from a sleep state in that an "off" state does not consume any power of the PCD 100B whatsoever as understood by one of ordinary skill in the art. Meanwhile, a hardware device of a PCD 100B in a sleep state consumes power, although at a very minimal level relative to its active state in which more power is consumed.

The second RAT module 119B may also be responsible for querying the sleep clock estimator module 107 when the first RAT module 119 has entered into a sleep state. The sleep clock estimator module 107 may comprise a first counter 305A and a second counter 305B. The sleep clock estimator module 107 may further comprise a driver 307 that is responsible for managing the functions and operations of the first counter 305A and the second counter 305B. The driver 307 may comprise software, however, hardware and/or firmware may be employed as understood by one of ordinary skill in the art.

Each counter 305 may comprise a hardware element, however, software may be utilized as understood by one of ordinary skill in the art. The first counter 305A may be responsible for monitoring the frequency of the sleep clock 117B. Meanwhile, the second counter 305B may be responsible for monitoring the frequency of the high accuracy clock 117A which is part of the server 100A as illustrated in FIG. 1.

Prior to a RAT module 119, such as the first RAT module 119, entering into a sleep state, the first RAT module 119 may query the sleep clock estimator module 107 to determine the current frequency of the sleep clock 117B. As mentioned above, the sleep clock 117B comprising a crystal oscillator is usually influenced by the current operating temperature of the PCD 100B.

When the driver 307 of the sleep clock estimator 107 receives the query from the first RAT module 119A, the driver 307 will issue commands to the first counter 305A and the second counter 305B to monitor the frequencies of the sleep clock 117B and the high accuracy clock 117A. The first counter 305A is coupled to the sleep clock 117B while the second counter 305B is coupled to the high accuracy clock 117A via an active RAT module 119.

The driver 307 may compare the frequency of the high accuracy clock 117A to the frequency of the sleep clock 117B in order to determine an estimate of the current frequency of the sleep clock 117B. The frequency of the sleep clock 117B is influenced by operating temperature of the PCD. Therefore, the sleep clock 117B may characterized as being a function of the current operating temperature of the PCD 100B.

The sleep clock estimator module 107 will pass the estimate of the current frequency of the sleep clock 117B to the requesting RAT module 119 before that module 119 enters into its sleep state. Upon receiving the estimate for the current frequency of the sleep clock 117B, the requesting RAT module 119 will determine at what value the module 119 will awake from its sleep state based on the estimate of the current frequency of the sleep clock 117B. As noted above, the sleep clock 117B may be running slower or faster relative to the high accuracy clock 117A of the server 100A.

After the requesting RAT module 119 enters into its desired sleep state, another RAT module 119, such as the second RAT module 119B, may query the sleep clock estimator module 107. The second RAT module 119B may periodically query the sleep clock estimator module 107 such that the sleep clock estimator module 107 determines the current frequency of the sleep clock 117B for a few iterations while the first RAT module 119A remains in its sleep state.

When the first RAT module 119A awakes from its sleep state, the error in the sleep clock frequency attributed to thermal changes may be calculated. According to one exemplary embodiment, the waking RAT module 119A may calculate this error. According to another exemplary embodiment, the sleep clock estimator module 107 may calculate this error. Once this error in the sleep clock frequency is determined, the waking RAT module 119 may adjust its internal clock 117C so that the waking RAT module 119 is in line or is synchronized relative to the other active RAT modules 119 as well as other components, such as the high accuracy clock 117A, of the system 101. In this way, changes in the frequency of the sleep clock 117B due to thermal changes within the PCD 100B may be mitigated and substantially eliminated.

Figure 4:
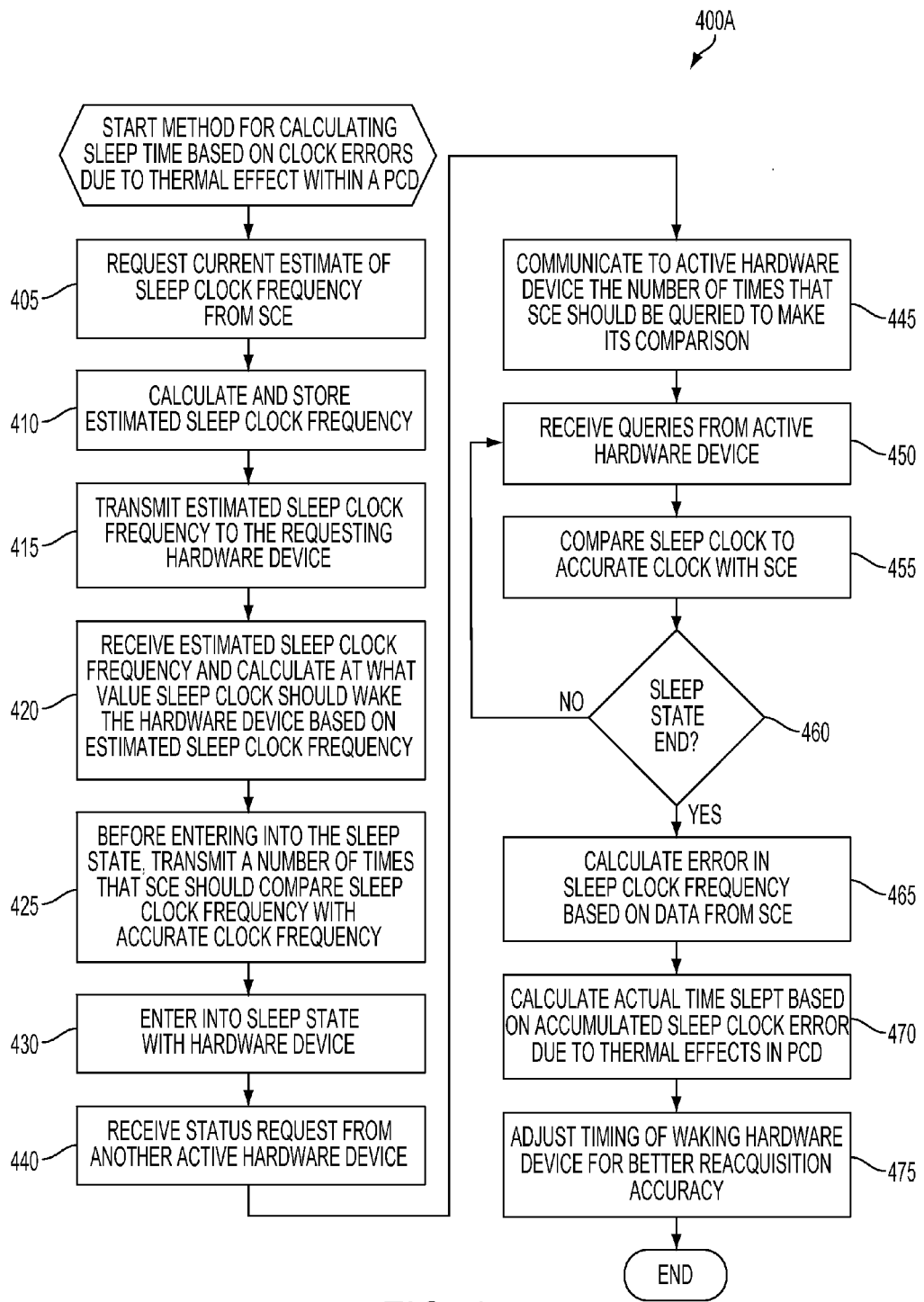
FIG. 4 is a logical flowchart illustrating a method for correcting timing errors due to thermal changes within a PCD.

FIG. 4 is a logical flowchart illustrating a method 400 for correcting timing errors due to thermal changes within a PCD 100B. Block 405 is the first step of the method 400. In block 405, a first RAT module 119A may request the sleep clock estimator module 107 to provide the current frequency of the sleep clock 117B. As noted previously, the frequency of the sleep clock 117B is generally a function of the operating temperature of a PCD 100B.

Next, in block 410, the sleep clock estimator module 107 may receive the request from a RAT module 119 about to enter into a sleep state. In this block 410, the sleep clock estimator module 107 may calculate and store an estimated frequency of the sleep clock 117B. As noted previously, the driver 307 of the sleep clock estimator module 107 may request the first counter 305A to monitor the current frequency of the sleep clock 117B. The driver 307 may also request the second counter 305B to monitor the current frequency of the high accuracy clock 117A that is present in the server 100A. By comparing values from the first counter 305A to values from the second counter 305B, the sleep clock estimator module 107 may determine a estimate of the difference or error between the frequency of the high accuracy clock 117A and the sleep clock 117B.

Next, in block 420, the sleep clock estimator 107 may transmit the estimate for the frequency of the sleep clock 117B to the requesting RAT module 119 which receives this estimate. In this block 420, the requesting RAT module 119 may calculate at what value from sleep clock 117B the RAT module 119 should be awakened from its sleep state based on the current estimated frequency of the sleep clock 117B.

In block 425, prior to the RAT module 119 entering into its sleep state, the RAT module 119 may transmit the number of times the sleep clock estimator module 107 should be queried so that it compares the sleep clock 117B with the high accuracy clock 117A. This number corresponding to how many times the sleep clock estimator module 107 should be queried by an active RAT module 119 is generally a function of the length of the sleep state. Usually, the longer the sleep state, the fewer number of queries will be required to calculate the error in the frequency of the sleep clock 117B. Similarly, the shorter the sleep state, the number of queries will usually be increased in order to calculate the error and the frequency of the sleep clock 117B.

Next, in block 430, the RAT module 119 may enter into its sleep state. As understood by one of ordinary skill in the art, a "sleep state" for a PCD 100B is one in which a particular hardware device of a PCD 100B consumes very little power and is considered to be dormant or inactive. A hardware device may exit a sleep state relatively quickly compared to an "off" state. An "off" state is quite different from a sleep state in that an "off" state does not consume any power of the PCD 100B whatsoever as understood by one of ordinary skill in the art. Meanwhile, a hardware device of a PCD 100B in a sleep state consumes power, although at a very minimal level relative to its active state in which more power is consumed.

In block 440, the sleep clock estimator module 107 may receive a status request from an active RAT module 107 which is not in a sleep state. Next, in block 445, the sleep clock estimator module 107 may communicate to the active RAT module 107 the number times and frequency at which the active RAT module 107 should query the sleep clock estimator 107 such that the sleep clock estimator 107 determines the current and instantaneous frequency of the sleep clock 117.

In block 450, the sleep clock estimator module 107 receives a query from the active RAT module 119 in accordance with block 445 described above. Next, in block 455, the sleep clock estimator module 107 compares the current frequency of the sleep clock 117B to the high accuracy clock 117A as described above in connection with FIG. 3. In this block 455, the sleep clock estimate module 107 may store the value of the current frequency of the sleep clock 117B that was calculated.

Next, in decision block 460, it is determined whether a sleep state for a sleeping RAT module 119 is over. If the inquiry to decision block 460 is negative, then the "NO" branch is followed back to block 450. If the inquiry to decision block 460 is positive, the "YES" branch is followed to block 465.

In block 465, the error in the frequency of the sleep clock 117B based on data that is prepared and stored by the sleep clock estimator module 107 may be calculated. As described previously in connection with FIG. 3 above, block 465 may be performed by either a RAT module 119 or the sleep clock estimator module 107. The error in the frequency of the sleep clock 117B may be calculated in one of two ways.

According to a first submethod, the RAT module 119 may determine the error in the frequency of the sleep clock 117B by using a simple mean sleep clock frequency calculation. According to this first submethod, the waking RAT module 119 may calculate the estimated error in frequency of the sleep clock 117B by taking a first estimated sleep clock frequency provided by the sleep clock estimator module 107 just before the RAT module 119 enters into its sleep state and adding this value to a second estimated sleep clock frequency provided by the sleep clock estimator module 107 when the RAT module 119 exits its sleep state. The waking RAT module 119 may divide the sum of these two values by two and arrived at an estimated mean sleep clock frequency. This first submethod performed by the waking RAT module 119 as illustrated in FIG. 5 described in further detail below.

According to the second submethod, the sleep clock estimator module 107 may record the values for the estimated frequency of the sleep clock 117B each time an active RAT module 119 queries the sleep clock estimator module 107 while the inactive RAT module 119 is sleeping. The sleep clock estimator module 107 may then integrate these readings to determine the actual error in the frequency of the sleep clock 117 over time.

Next, in block 470, the waking RAT module 119 may calculate its actual time that it slept relative to the high accuracy clock 117A based on the accumulated sleep clock error due to thermal effects of the PCD 100B. Next, in block 475, the waking RAT module 119 may adjust the timing of its internal clock 117C based on the calculation of its actual time slept made in block 470. The method 400 then ends.

Figure 5:
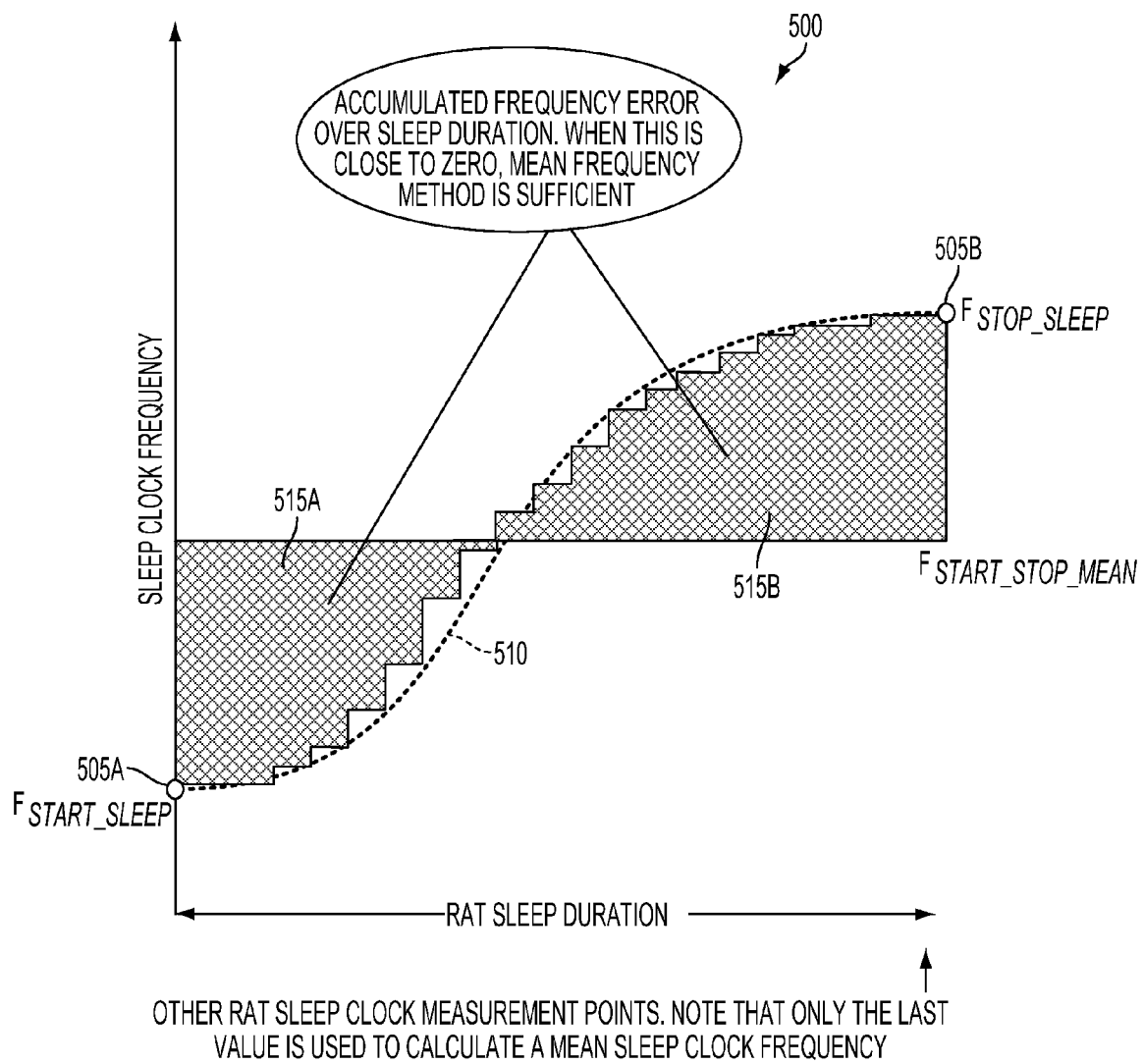
FIG. 5 is a graph illustrating a first exemplary embodiment for calculating error in a sleep clock frequency.

FIG. 5 is a graph 500 illustrating a first exemplary embodiment for calculating error in frequency of a sleep clock 117B of a PCD 100B due to thermal changes within the PCD 100B. The graph 500 comprises a Y-axis representing a current sleep clock frequency and an X-axis representing the duration of sleep in units of time for a RAT module 119.

According to this exemplary embodiment, as described above in connection with a first submethod for block 465, a waking RAT module 119 may take the value of the estimated frequency for the sleep clock 117B at point 505A and add it to the value of the estimated frequency for the sleep clock 117B at point 505B. The value at point 505A is calculated by the sleep clock estimator module 107 just prior to a RAT module 119 entering into its sleep state. The value at point 505B is calculated by the sleep clock estimator module as soon as a waking RAT module 119 exits its sleep state. The waking RAT module 119 may add these values together and then divide by two in order to compute a mean sleep clock frequency for the sleep clock 117B.

This first submethod is less preferred relative to the second submethod illustrated in FIG. 6 and described below because the change in frequency of the sleep clock 117B may not always be linear or constant over time. Graph 500 demonstrates this concern for the first submethod since the plot 510 representing the shift in the sleep clock frequency is not completely linear and follows a geometry very similar to a sine function. Since the plot 510 follows a geometry very similar to a sine function, the two areas 515A, 515B representing frequency error under the plot 510 may not always be equal as illustrated in FIG. 5. In FIG. 5, the first area 515A representing a first portion of the frequency error is less than a second area 515B representing a second portion of the frequency error in the sleep clock 117B. When a mean is used to calculate the error of a sine function, such a calculation may ignore subtle changes that occur between the two endpoints 505A, 505B.

Figure 6:
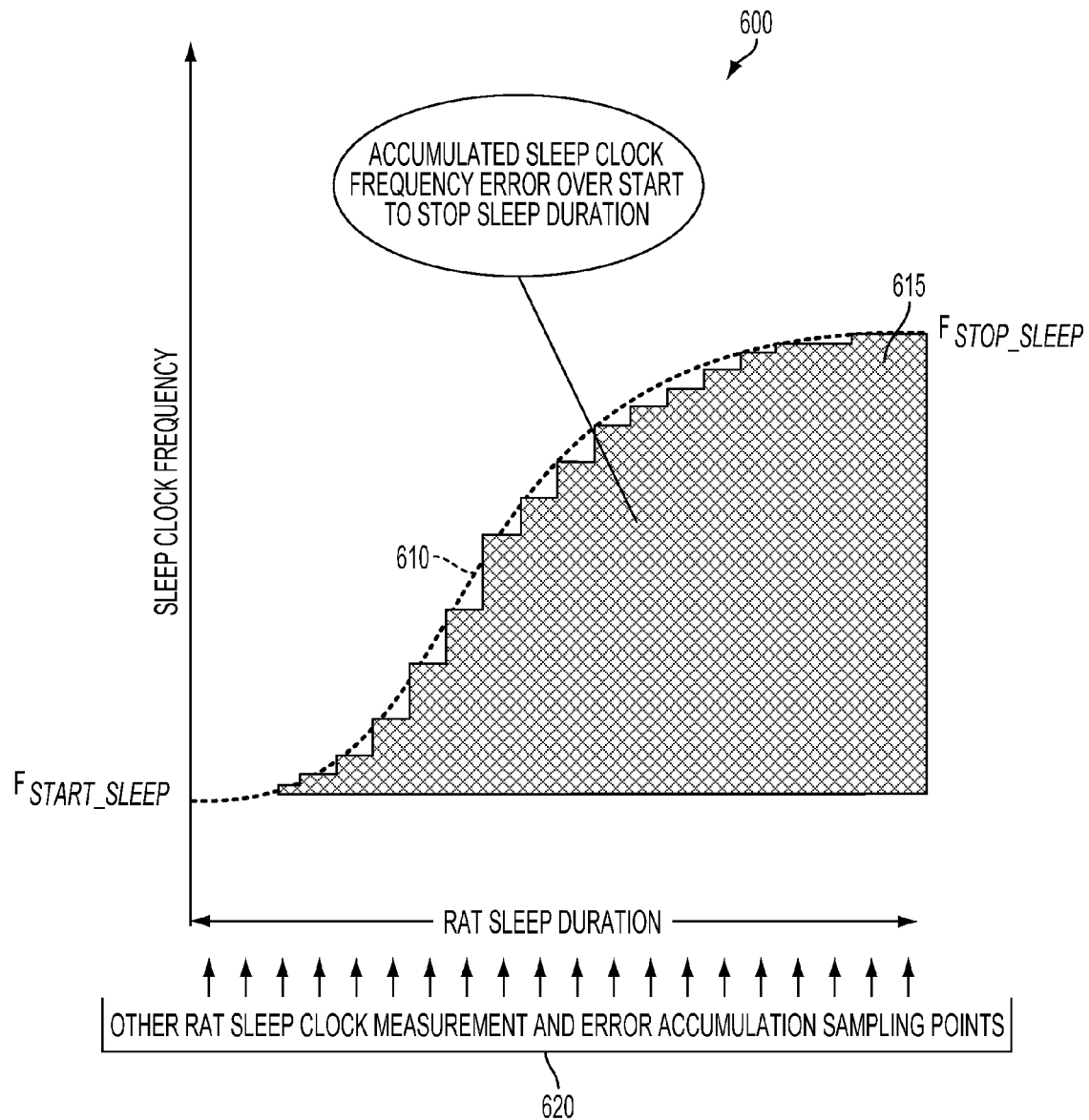
FIG. 6 is a graph illustrating a second exemplary embodiment for graduating error in a sleep clock frequency.

FIG. 6 is a graph 500 illustrating a second exemplary embodiment for calculating error in frequency of a sleep clock 117B of a PCD 100B due to thermal changes within the PCD 100B. The graph 600 comprises a Y-axis representing a current sleep clock frequency and an X-axis representing the duration of sleep in units of time for a RAT module 119.

According to this exemplary embodiment, as described above in connection with a second submethod for block 465, the sleep clock estimator module 107 may determine the area 615 under the curve 610. The area 615 under the curve 610 may represent the accumulated error in the frequency of the sleep clock 117B over time. The curve 610 may represent the actual sleep clock frequency at each given instant of time.

The sleep clock estimator module 107 may determine the area 615 under the curve by completing an integration function as understood by one of ordinary skill the art. The second submethod for integrating sleep clock frequency error over time of FIG. 6 is generally preferred over the first submethod illustrated in connection with FIG. 5 because this second submethod may provide more accurate error with respect to the frequency of the sleep clock 117B.

However, the first submethod illustrated in FIG. 5 may be preferred when it is known that the accumulated frequency error may be represented or captured well by the mean frequency and/or when low or less granularity sleep clock measurements are desired. The second submethod may be less preferred since it is a little more complex to implement relative to the first submethod. The second submethod generally requires more sampling points 620 and it may require a central entity, such as the sleep clock estimator 107, to handle the requests of multiple RAT modules 119.

Figure 7:
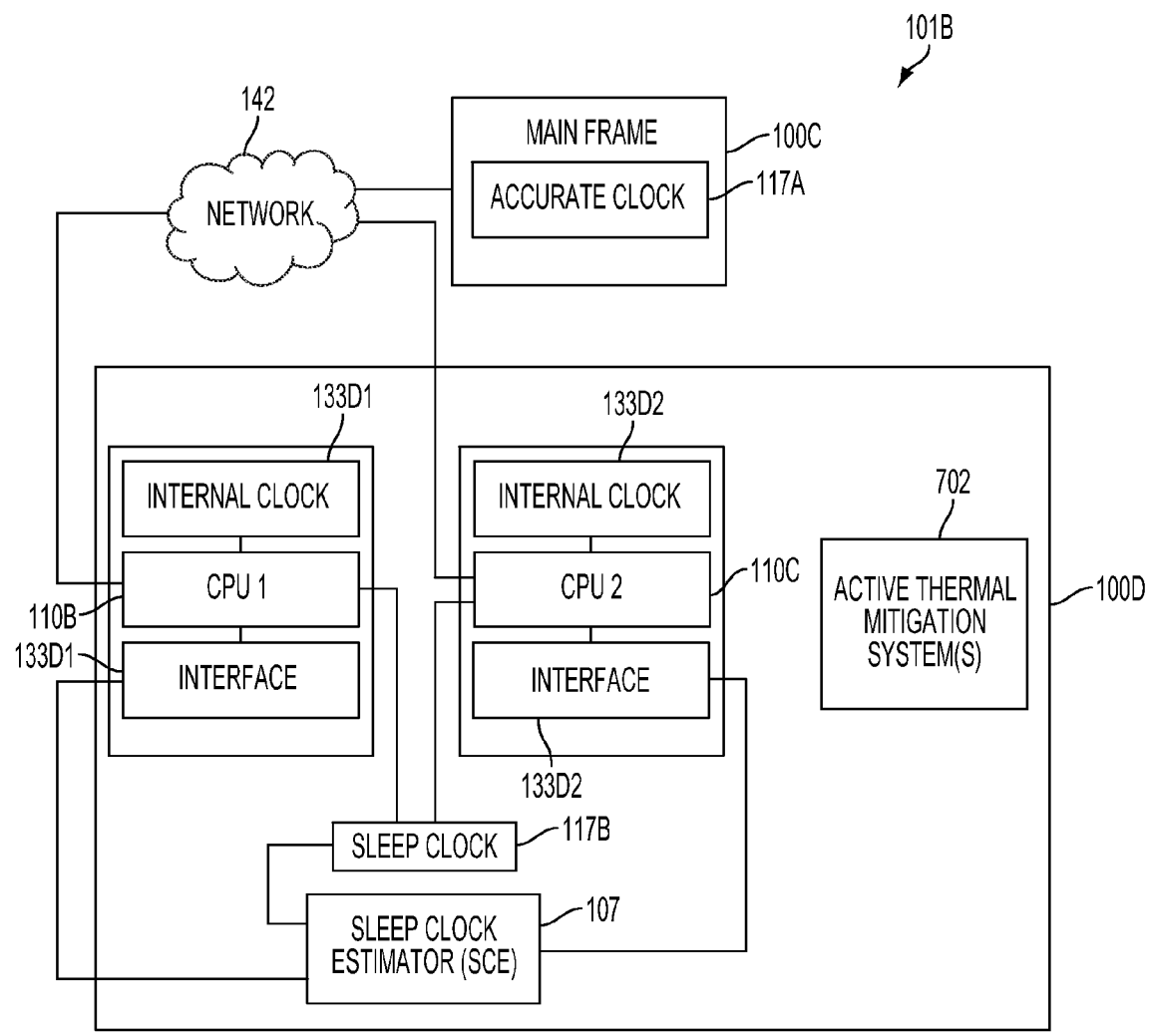
FIG. 7 is a functional block diagram illustrating an alternate exemplary embodiment of a system for correcting timing errors due to thermal changes within a personal computer.

FIG. 7 is a functional block diagram illustrating an alternate exemplary embodiment of a system 101B for correcting timing errors due to thermal changes within a personal computer 100D. The system 101B of FIG. 7 will generally operate similar to the system 101 as described above in connection with FIG. 1-6. Therefore, only the differences between the two exemplary embodiments of the system 101 will be described will be described below.

According to this exemplary embodiment of the system 101B may comprise a mainframe computer 100C that is always active or in an "ON" state. The mainframe computer 100C may comprise a high accuracy clock 117A similar to the high accuracy clock 117A of the server computer 100A illustrated in FIG. 1. The system 101B may further comprise one or more laptops or personal computers ("PCs") 100D. The PCs 100D may comprise multiple CPUs 110B, 110C that are coupled to a sleep clock 117B.

Unlike the PCD 100B of FIGS. 1 and 2, the PC 100D of FIG. 7 may comprise one or more active thermal mitigation systems 702. The active thermal mitigation systems 702 may consume power. The active thermal mitigation system 702 may comprise active cooling devices such as fans, liquid cooling systems, and the like.

The sleep clock estimator module 107 of the PC 100D may function similarly as described above in connection with FIGS. 1-6. The CPUs 110B, 110C may also function similarly to the RAT modules 119 described above in connection with FIGS. 1-6.

A method 400 and system 101 for correcting the timing associated with a sleep clock 117B that may be negatively impacted by internal heating of PCD 100 has been described. This method 400 and system 101 is unique relative to other conventional systems. When unique aspect of method 400 and system 101 is that the method 400 and system 1012 not rely on any temperature measurements to calculate the error in the frequency of the sleep clock 117B. Instead, the method 400 and system 101 use a high accuracy clock 117A as a baseline to determine error in the frequency of the sleep clock 117B without the need or use of any complicated temperature calculations.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGs. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for correcting timing of a portable computing device caused by internal heating, comprising:
   calculating an estimate of frequency for a first clock compared to a second clock;
   calculating a length of a sleep state for a hardware device in terms of clock cycles based on the estimate of frequency for the first clock;
   transmitting a number representing how many times an error in the frequency of the first clock should be calculated during the sleep state;
   calculating an error in the frequency of the first clock for a duration of the sleep state, wherein during the sleep state the error in the frequency of the first clock is calculated the transmitted number of times; and
   calculating a magnitude of time from the error in the frequency that represents an actual length of the sleep state in terms of number of cycles of the second clock.

2. The method of claim 1, wherein the first clock comprises a crystal oscillator.

3. The method of claim 1, wherein the second clock comprises a system clock.

4. The method of claim 1, wherein the first clock comprises a sleep clock of the portable computing device.

5. The method of claim 1, wherein the hardware device comprises at least one of a radio access technology, a processor, and central processing unit.

6. The method of claim 1, further comprising:
   adjusting a timing of a third clock corresponding to the hardware device based on the magnitude of time that corresponds to the actual length of the sleep state relative to the second clock.

7. The method of claim 1, wherein the hardware device is a first hardware device, the method further comprising:
   receiving a request from a second hardware device to compare the frequency of the first clock to the frequency of the second clock.

8. The method of claim 1, wherein calculating the error in the frequency of the first clock for a duration of the sleep state comprises at least one of a mean calculation and an integration calculation.

9. The method of claim 1, wherein the portable computing device does not comprise any active thermal mitigation systems that consume power.

10. A computer system for correcting timing of a portable computing device caused by internal heating, the system comprising:
    a processor operable for:
       calculating an estimate of frequency for a first clock compared to a second clock;
       calculating a length of a sleep state for a hardware device in terms of clock cycles based on the estimate of frequency for the first clock;
       transmitting a number representing how many times an error in the frequency of the first clock should be calculated during the sleep state;
       calculating an error in the frequency of the first clock for a duration of the sleep state, wherein during the sleep state the error in the frequency of the first clock is calculated the transmitted number of times; and
       calculating a magnitude of time from the error in the frequency that represents an actual length of the sleep state in terms of the number of cycles of the second clock.

11. The system of claim 10, wherein the first clock comprises a crystal oscillator.

12. The system of claim 10, wherein the second clock comprises a system clock.

13. The system of claim 10, wherein the first clock comprises a sleep clock of the portable computing device.

14. The system of claim 10, wherein the hardware device comprises at least one of a radio access technology, a processor, and central processing unit.

15. The system of claim 10, wherein the processor is further operable for:
    adjusting a timing of a third clock corresponding to the hardware device based on the magnitude of time that corresponds to the actual length of the sleep state relative to the second clock.

16. The system of claim 10, wherein the hardware device is a first hardware device, the processor further operable for:
    receiving a request from a second hardware device to compare the frequency of the first clock to the frequency of the second clock.

17. The system of claim 10, wherein calculating the error in the frequency of the first clock for a duration of the sleep state comprises at least one of a mean calculation and an integration calculation.

18. The system of claim 10, wherein the portable computing device does not comprise any active thermal mitigation systems that consume power.

19. A computer system for correcting timing of a portable computing device caused by internal heating, the system comprising:
    means for calculating an estimate of frequency for a first clock compared to a second clock, wherein the first clock and the second clock operate during sleep states and during non-sleep states;
    means for calculating a length of a sleep state for a hardware device in terms of clock cycles based on the estimate of frequency for the first clock;
    means for transmitting a number representing how many times an error in the frequency of the first clock should be calculated during the sleep state;
    means for calculating an error in the frequency of the first clock for a duration of the sleep state, wherein during the sleep state the error in the frequency of the first clock is calculated the transmitted number of times; and
    means for calculating a magnitude of time from the error in the frequency that represents an actual length of the sleep state in terms of number of clock cycles of the second clock.

20. The system of claim 19, wherein the first clock comprises a crystal oscillator.

21. The system of claim 20, wherein the second clock comprises a system clock.

22. The system of claim 19, wherein the first clock comprises a sleep clock of the portable computing device.

23. The system of claim 19, wherein the hardware device comprises at least one of a radio access technology, a processor, and central processing unit.

24. The system of claim 19, further comprising:
means for adjusting a timing of a third clock corresponding to the hardware device based on the magnitude of time that corresponds to the actual length of the sleep state relative to the second clock.

25. The system of claim 19, wherein the hardware device is a first hardware device, the system further comprising:
means for receiving a request from a second hardware device to compare the frequency of the first clock to the frequency of the second clock.

26. The system of claim 19, wherein the means for calculating the error in the frequency of the first clock for a duration of the sleep state further comprises at least one of a mean calculation and an integration calculation.

27. The system of claim 19, wherein the portable computing device does not comprise any active thermal mitigation systems that consume power.

28. A computer program product comprising a non-transitory computer usable medium having a computer readable program code embodied therein, said computer readable program code adapted to be executed to implement a method for correcting timing of a portable computing device caused by internal heating, said method comprising:
calculating an estimate of frequency for a first clock compared to a second clock;
calculating a length of a sleep state for a hardware device in terms of clock cycles based on the estimate of frequency for the first clock;
transmitting a number representing how many times an error in the frequency of the first clock should be calculated during the sleep state;
calculating an error in the frequency of the first clock for a duration of the sleep state, wherein during the sleep state the error in the frequency of the first clock is calculated the transmitted number of times; and
calculating a magnitude of time from the error in the frequency that represents an actual length of the sleep state in terms of number of cycles of the second clock.

29. The computer program product of claim 28, wherein the first clock comprises a crystal oscillator.

30. The computer program product of claim 28, wherein the second clock comprises a system clock.

31. The computer program product of claim 28, wherein the first clock comprises a sleep clock of the portable computing device.

32. The computer program product of claim 28, wherein the hardware device comprises at least one of a radio access technology, a processor, and central processing unit.

33. The computer program product of claim 28, wherein the program code implementing the method further comprises:
adjusting a timing of a third clock corresponding to the hardware device based on the magnitude of time that corresponds to the actual length of the sleep state relative to the second clock.

34. The computer program product of claim 28, wherein the hardware device is a first hardware device, wherein the program code implementing the method further comprises:
receiving a request from a second hardware device to compare the frequency of the first clock to the frequency of the second clock.

35. The computer program product of claim 28, wherein calculating the error in the frequency of the first clock for a duration of the sleep state comprises at least one of a mean calculation and an integration calculation.

36. The computer program product of claim 28, wherein the portable computing device does not comprise any active thermal mitigation systems that consume power.

* * * * *